United States Patent
Pelz (10) Patent No.: US 10,315,081 B2
(45) Date of Patent: Jun. 11, 2019

(54) GOLF CLUB HOLSTER

(71) Applicant: David T. Pelz, Dripping Springs, TX (US)

(72) Inventor: David T. Pelz, Dripping Springs, TX (US)

(*) Notice: Subject to any disclaimer, the term of this patent is extended or adjusted under 35 U.S.C. 154(b) by 0 days.

(21) Appl. No.: 15/218,041

(22) Filed: Jul. 24, 2016

(65) Prior Publication Data

US 2017/0021241 A1 Jan. 26, 2017

Related U.S. Application Data

(60) Provisional application No. 62/196,842, filed on Jul. 24, 2015.

(51) Int. Cl.
| | | |
|---|---|---|
| *A63B 55/00* | (2015.01) | |
| *A63B 55/10* | (2006.01) | |
| *F16B 2/22* | (2006.01) | |
| *F16B 7/10* | (2006.01) | |

(52) U.S. Cl.
CPC ............ *A63B 55/408* (2015.10); *A63B 55/10* (2013.01); *F16B 2/22* (2013.01); *F16B 7/105* (2013.01)

(58) Field of Classification Search
CPC ........ F63B 55/408; F63B 55/10; F16B 7/105; F16B 2/22
USPC ..... 206/315.1, 315.2, 315.6; 248/121, 311.2, 248/408, 539
See application file for complete search history.

(56) References Cited

U.S. PATENT DOCUMENTS

| | | | | |
|---|---|---|---|---|
| 1,661,500 | A | * 3/1928 | Reach | A63B 55/10 294/159 |
| 3,322,381 | A | * 5/1967 | Bubb | A47F 5/05 24/339 |
| 5,301,519 | A | * 4/1994 | Howorka | A63B 55/00 62/457.5 |
| 5,620,091 | A | * 4/1997 | Larson | A63B 55/00 206/315.6 |
| 5,829,604 | A | * 11/1998 | Brophy | A63B 55/10 211/70.2 |
| 5,842,564 | A | * 12/1998 | Clement | A63B 55/00 206/315.2 |
| 6,640,970 | B1 | * 11/2003 | Townsend, Jr. | A45C 7/0045 206/315.2 |
| 2006/0208143 | A1 | * 9/2006 | Romano | A63B 55/10 248/222.13 |
| 2008/0006547 | A1 | * 1/2008 | Pace | A63B 55/10 206/315.2 |
| 2010/0300900 | A1 | * 12/2010 | Quan | A45C 11/16 206/6.1 |
| 2011/0215013 | A1 | * 9/2011 | Young | A63B 55/10 206/315.2 |
| 2013/0306503 | A1 | * 11/2013 | Johnson | A63B 55/10 206/315.2 |
| 2017/0021241 | A1 | * 1/2017 | Pelz | A63B 55/408 |

* cited by examiner

*Primary Examiner* — Muhammad Ijaz
(74) *Attorney, Agent, or Firm* — Cesari & Reed, LLP; R. Michael Reed (57) ABSTRACT

In some embodiments, a golf club holster may include a substrate and a fastener coupled to the substrate and configured to couple the substrate to an external surface of a golf bag. The golf club holster may further include a club holder element coupled to the substrate, the club holder element including one or more clamps configured to grip a shaft of one or more golf clubs.

20 Claims, 10 Drawing Sheets

GOLF CLUB HOLSTER

CROSS-REFERENCE TO RELATED APPLICATION(S)

This application is a non-provisional of and claims priority to U.S. Provisional Patent Application No. 62/196,842 filed on Jul. 24, 2015 and entitled "Golf Club Holster", which is incorporated herein by reference in its entirety.

FIELD

The present disclosure is generally related to golf club holders, and more particularly to devices that may be attached to a golf bag to allow for quick retrieval of frequently used clubs, such as the putter.

BACKGROUND

Golfers tend to use some clubs more frequently than others. For example, the putter is a club that is used on every hole, unless the golfer is fortunate enough to complete a hole in one or chip in from off the green. Other frequently used clubs may include a driver, a pitching wedge, or a particular golfer's favorite club. However, without regard for the frequency with which golfers may use such clubs, golfers spend a disproportionate amount of time during each round searching through the plurality of golf clubs in the golf bag to locate the particular club needed for each particular shot and retrieving it from the bag, or re-inserting it into the bag (often clubs get stuck during these processes).

SUMMARY

In some embodiments, a golf club holster may include a substrate and a fastener coupled to the substrate and configured to couple the substrate to an external surface of a golf bag. The golf club holster may further include a club holder element coupled to the substrate, the club holder element including one or more clamps configured to grip a shaft of one or more golf clubs.

In other embodiments, a golf club holster may include a shaft formed of a plurality of segments including at least one telescoping segment and at least one rotatable segment. Further, the golf club holster may include a hook coupled to the shaft and configured to couple a top portion of the shaft to a top portion of a golf bag. Additionally, the golf club holster can include a club holder element coupled to the shaft and including one or more clamps configured to grip a shaft of a corresponding one or more golf clubs.

In still other embodiments, a golf club holster can include a shaft formed of a plurality of segments including at least one telescoping segment and at least one rotatable segment. Further, the golf club holster may include a hook coupled to the shaft and configured to couple a top portion of the shaft to a top portion of a golf bag. The golf club holster can also include a club holder element coupled to the shaft. The club holder element may include a plurality of clamps including a first clamp and at least one second clamp. Each clamp may be configured to grip a shaft of a corresponding one or more golf clubs.

In some embodiments, a golf club holster may include a support structure including a clip or clamp configured to hold a shaft of a golf club. In certain embodiments, the support structure may be configured to release-ably couple to an exterior surface of a golf bag. In certain embodiments, the golf club holster may include a cup configured to support a grip of the golf club. In some embodiments, the support structure of the golf club holster may include an extendable shaft portion.

In some embodiments, the golf club holster may include an attachment mechanism, such as a hook, configured to couple the holster to a top portion of a golf bag. In some embodiments, the golf club holster may include one or more straps configured to secure the golf club holster to the golf bag.

In some embodiments, a golf club holster may include a substrate and a fastener coupled to the substrate and configured to couple the substrate to an external surface of a golf bag. The golf club holster may further include at least one clamp coupled to the substrate and configured to grip a shaft of a golf club.

In still other embodiments, a golf club holster may include a shaft formed of a plurality of segments including at least one telescoping segment and at least one rotatable segment. The golf club holster may further include a hook coupled to the shaft and configured to couple a top portion of the shaft to a top portion of a golf bag. The golf club holster may also include at least one clamp coupled to the shaft and configured to grip a golf club or a plurality of frequently used golf clubs.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of golf club holsters, devices, and methods are described below that provide advantages over traditional golf bags and traditional golf club holders, such as sleeves and organizers. In some embodiments, a golf club holster may include a shaft or substrate having a golf club holder, which may include multiple clamps, (or one clamp which grips multiple club shafts) each of which may or may not be rotatably adjusted about the shaft or substrate and each of which may be configured to secure a shaft of one or more golf clubs. The golf club holster may be releasably secured to an exterior surface of a golf bag, and selected clubs, such as frequently used golf clubs, may be inserted into the clamps for quick and easy retrieval and return of the club during a round of golf.

By using the golf club holster to secure a driver, a putter, and a frequently used "short" iron, such as a sand wedge, a pitching wedge, a nine iron, and so on, a golfer may save up to approximately 20 minutes per round of golf because he or she need not search for the commonly used clubs or struggle to return them to within the confines of the crowded golf bag (which often contains 14 or even up to 17 or 20 other clubs), but rather can simply grab the club from the golf club holster and return the club to the holster when finished with one easy motion, without conflict with any other clubs. For clubs that have large grips, the golf club holster can also provide a significant time savings, since the golfer will not have to fight to remove the club or to put it back in the bag. One possible embodiment of a golf club holster is described below with respect to FIG. 1.

Figure 1:
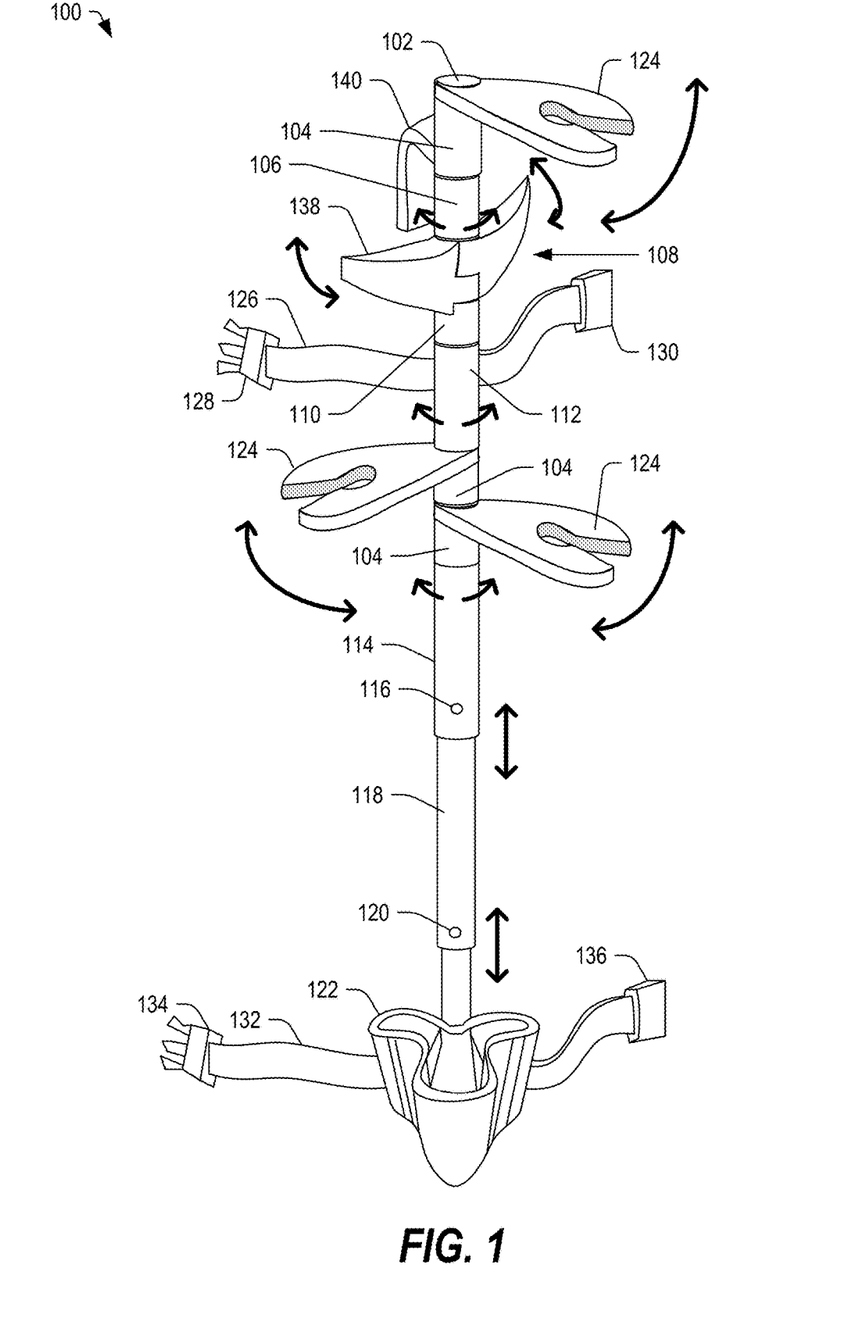
FIG. 1 is a perspective view of a golf club holster, in accordance with certain embodiments of the present disclosure.

FIG. 1 is a perspective view of a golf club holster 100, in accordance with certain embodiments of the present disclosure. The golf club holster 100 may include a shaft 102 defining a vertical axis. The golf club holster 100 may include one or more golf club holders, where each golf club holder includes one or more clamps 124. In the illustrated example, the golf club holster 100 may include one or more clamps 124 extending from the shaft at an angle that is substantially perpendicular relative to the vertical axis. Each clamp 124 may be configured to grip a shaft or multiple shafts of a golf club(s). In some embodiments, an interior surface of the clamp 124 may be lined with a soft thermoplastic rubber or other inlay to provide a bumper and to prevent movement and scratching of the shaft of a golf club. At a bottom end, the golf club holster may include a holder 122 coupled to the shaft 102 and configured to support an end of a golf club. In some embodiments, a grip of a golf club may be set into the holder 122, and the shaft of the club may be pushed into one of the clamps 124 to secure a golf club into the golf club holster 100.

In some embodiments, the shaft 102 of the golf club holster 100 may be formed from multiple segments, some of which may be rotatable about the vertical axis and some of which may be extendable (telescoping) along the vertical axis. Further, some of the segments may include features, such as clamps, hooks, arms, or other features configured either to secure the golf club holster 100 to a golf bag or to secure a golf club to the golf club holster.

In some embodiments, the golf club holster 100 may include a segment 104 including a clamp 124, a segment 106 including a hook 140, rotatable segments 106 and 110, a butterfly segment 108 having adjustable arms 138, and an attachment segment 112 including a strap 126 with a connector 128 and a receptacle 130 configured to couple to a structure, such as a golf bag. The segments 104, 106, 108, and 110 may be rotatable about the vertical axis. The golf club holster 100 may further include a first telescoping segment 114 and a second telescoping segment 118. The first telescoping segment 114 may include a button 116 to selectively adjust the segment 114 relative to a second telescoping segment 118. The second telescoping segment 118 may include a button 120, which may be used to selectively adjust the telescoping segment 118 relative to a corresponding segment associated with a holder 122.

The golf club holster 100 may further include a first strap 126 coupled to the segment 112. The strap 126 may include a connector 128 that may snap into a corresponding receptacle 130. The strap 126 may be adjustable and may be configured to extend around a golf bag such that the connector 128 can couple to the receptacle 130 to secure the golf club holster 100 to the golf bag. In some embodiments, the golf club holster 100 may also include a second strap 132 coupled to the holder 122. The second strap 132 may be coupled to a connector 134 and to a receptacle 136. The strap 132 may be adjustable and may be configured to extend around a lower portion of the golf bag such that the connector 134 can couple to the receptacle 136 to secure the golf club holster 100 to the golf bag. In some embodiments, the strap 126 is attached to the golf club holster 100 at a location that is high relative to the golf bag where the golf bag is substantially rigid to hold the bag at a location where the bag is relatively stiff and strong.

In some embodiments, the golf club holster 100 may include arms 138 associated with the segment 108. The segment 108 may be rotatable about the vertical axis independent of other segments. Moreover, the arms 138 may be adjusted to extend or contract to form a tight fit against an exterior surface, such as the surface of a golf bag. In some embodiments, the golf club holster 100 may further include a hook or clip 140, which may be configured to fit over a lip or edge of a golf bag and to extend into the golf back. The hook or clip 140 may be configured to apply a downward force on a top edge of the golf bag and the portion of the hook or clip 140 that extends into the golf bag may prevent the golf club holster 100 from slipping. The hook or clip 140 is configured to prevent the golf club holster 100 from slipping off or sliding down (parallel to the vertical axis) when the golf club holster 100 is in use.

In some embodiments, the clamps 124 (which may have one or multiple golf club shaft openings) may be adjusted by rotating the segments 104 such that the clamps 124 may extend in different directions from the bag and from one another. By allowing for rotational adjustment of the clamps 124, a user may arrange the clamps 124 to provide clearance away from the surface of the golf bag and to keep the heads of the clubs from touching. In some embodiments, other segments, including segment 104 and segment 106, may be adjusted (rotationally) to ensure a tight fit of the golf club holster 100 to the golf bag and to ensure that the holder 122 extends away from the golf bag.

In some embodiments, by providing adjustable straps, the golf club holster 100 may be used with various types and sizes of bags. Moreover, the segments 114 and 118 may be adjusted along the vertical axis (telescoping segments) to extend or reduce the length of the shaft to fit the size of the clubs or the size of the golf back, making it possible to use the golf club holster 100 with golf bags sized for adults or for kids (one size fits all).

In some embodiments, the strap 132 may be omitted. Further, in some embodiments, a hook or lip may be provided along a bottom portion of the shaft, which hook or lip may be configured to couple to a bottom of the golf bag to secure the golf club holster 100. In some embodiments, the hook or lip may extend approximately a width of the golf bag and may be configured to secure the golf club holster 100 to the bottom using the weight of the golf bag. In other words, the golf bag may rest on the hook or lip, pinching the hook or lip between the bottom of the golf bag and a surface (such as the club area of a golf cart). In some embodiments, this hook or lip may be adjustable to fit different size golf bags. In some embodiments, the strap 132 may be replaced by an elastic loop. In some embodiments, the strap may be provided with a snap or other fastener configured to mate with a corresponding feature on the golf bag. Other embodiments are also possible.

In some embodiments, the golf club holster 100 may be configured to releasably attach to a golf bag or other structure. One possible example of the golf club holster 100 coupled to a golf bag is described below with respect to FIG. 2.

Figure 2:
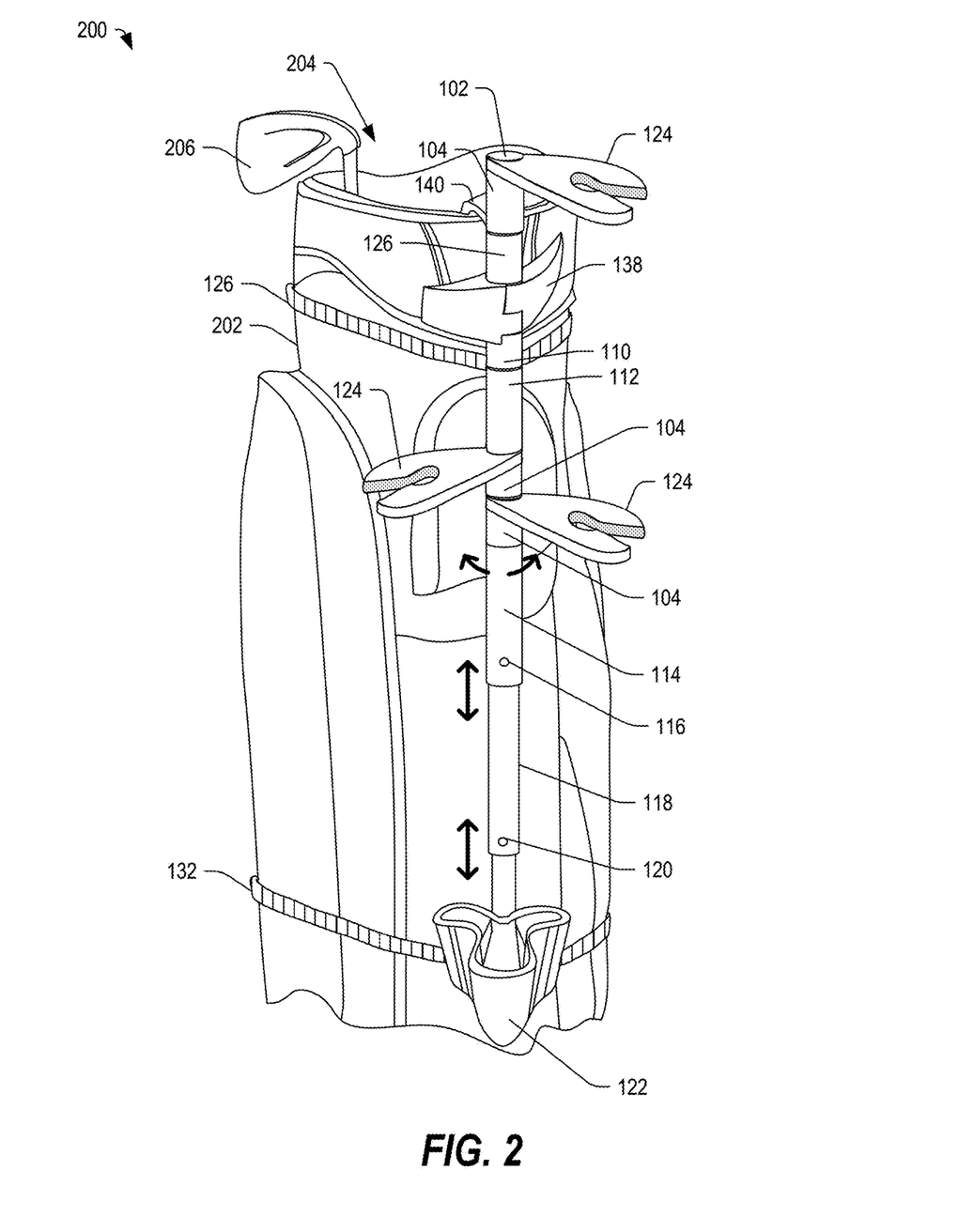
FIG. 2 is perspective view of an apparatus including a golf club bag and a golf club holster, in accordance with certain embodiments of the present disclosure.

FIG. 2 is perspective view of an apparatus 200 including a golf club bag 202 and a golf club holster 100, in accordance with certain embodiments of the present disclosure. The golf club holster 100 of the apparatus 200 includes all of the elements of the golf club holster 100 in FIG. 1. In the illustrated example, the strap 126 extends around an upper portion of the golf bag 202. The strap 132 extends around a lower portion of the golf bag 202. Further, the golf back 202 includes an opening 204 sized to receive a plurality of golf clubs, such as the iron 206. In this example, the hook or clip 140 extends over a top edge of the golf bag and into the opening to secure the golf club holster 100 to the golf bag 202.

In some embodiments, the clamps 124 (each of which may contain one, two, three or more openings for one, two, three or multiple club shafts) may be turned in different directions to allow for spacing between clubs. Further, in some embodiments, the segments may be adjusted as needed to provide a desired alignment of the hook or clip 140 relative to the golf bag 202 and to provide a selected alignment of the holder 122 relative to the golf bag 202. Further, though the holder 122 is shown extending over a lower portion of the golf bag 202 that is not at a bottom of the golf bag 202, it is possible to extend the segments 114 and 116 to extend a length of the golf club holster 100 to fit the golf bag 202. Other embodiments are also possible.

In some embodiments, the segments may be omitted or additional segments may be added to further extend a length of the shaft 102. In some embodiments, multiple telescoping segments may be included. In some embodiments, the golf club holster 100 may include a different number of clamps 124, such as one clamp (with multiple shaft openings), two clamps or four clamps. In some embodiments, an additional clamp 124 may be included and the user may assemble the golf club holster 100 to have a desired number of clamps 124. Other embodiments are also possible.

Figure 3:
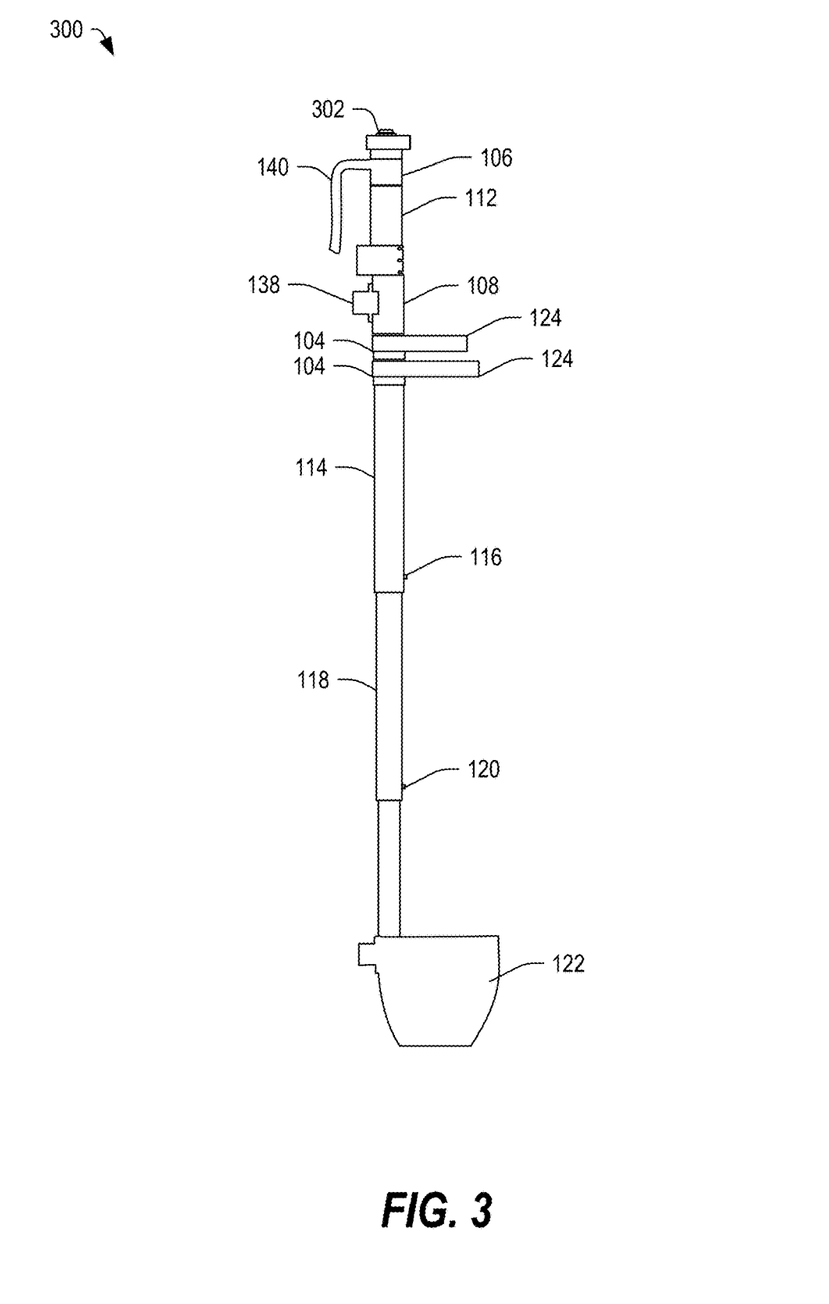
FIG. 3 is a side view of a golf club holster, in accordance with certain embodiments of the present disclosure.

FIG. 3 is a side view of a golf club holster 300, in accordance with certain embodiments of the present disclosure. In some embodiments, the golf club holster 300 may include all of the elements of the golf club holster 100 of FIGS. 1 and 2. Further, the golf club holster 300 may include a button 302 configured to unlock the shaft 102 to allow for rotation of the various elements. In some embodiments, the button 302 may be used to unlock the telescoping segments 114 and 118. In a particular example, the button 302 may be coupled to a mechanism within the shaft 102 that may selectively secure or release the telescoping segments 114 and 118, and selection of the button 302 (such as by pressing the button 302) may enable adjustment to the length of the shaft 102 by extending one or both of the telescoping segments 114 and 118. In some embodiments, the golf club holster 100 may extend to a length of up to thirty inches. In some embodiments, the golf club holster 100 may extend or segments may be added to extend the golf club holster 100 to have a length of more than thirty inches.

Figure 4:
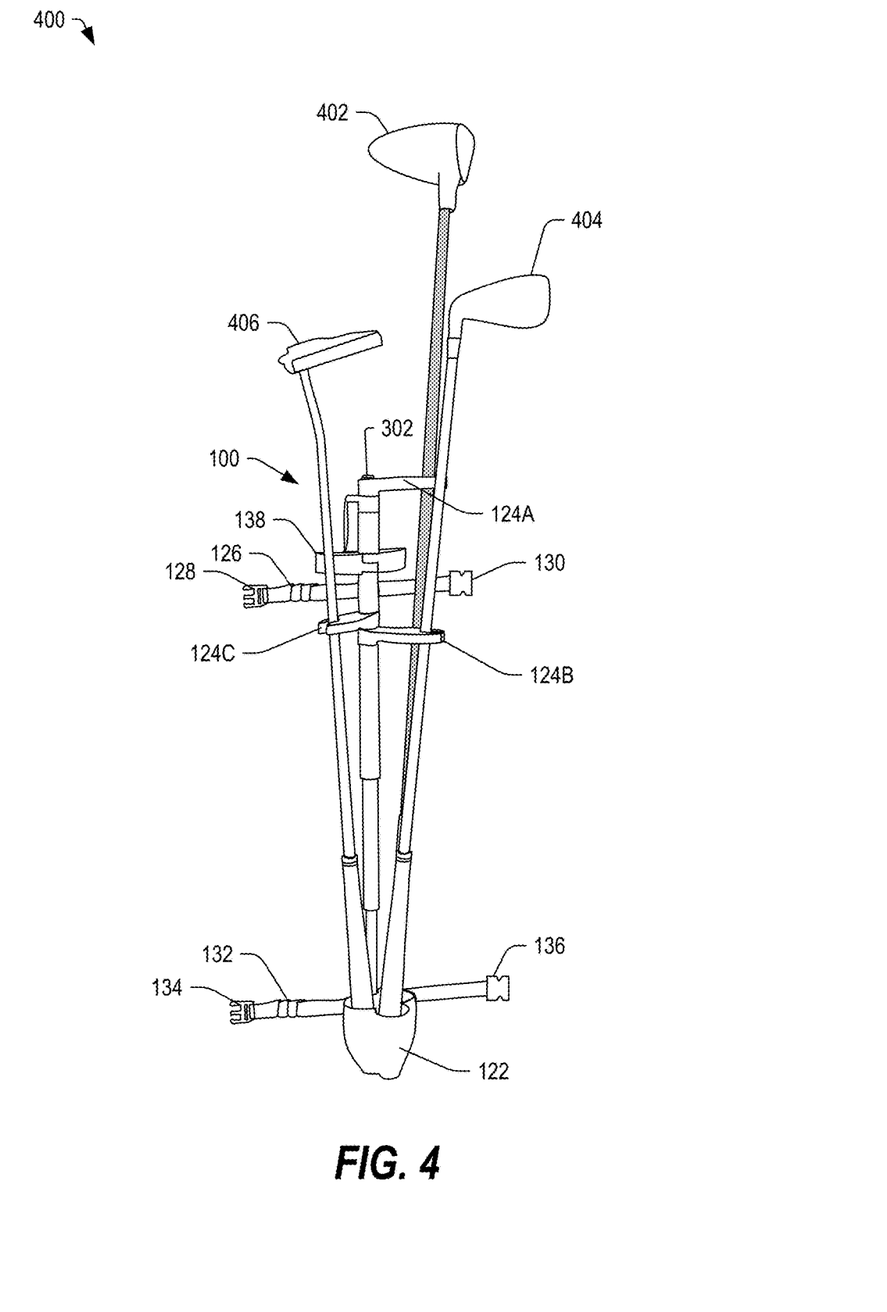
FIG. 4 is a perspective view of a golf club holster securing three golf clubs, in accordance with certain embodiments of the present disclosure.

FIG. 4 is a perspective view of a golf club holster 400 securing three golf clubs 402, 404 and 406, in accordance with certain embodiments of the present disclosure. In the illustrated example, the holder 122 may be flared or tapered to facilitate insertion of the grip of the club. In the illustrated example, the grip of the driver 402 may be inserted into the holder 122 and the shaft of the driver 402 may be pressed into the clamp 124A. The grip of the iron 404 may be inserted into the holder 122 and the shaft of the iron 404 may be pressed into the clamp 124B. The grip of the putter 406 may be inserted into the holder 1122 and the shaft of the putter 406 may be pressed into the clamp 124C. Each clamp 124 may hold a different club. Further, the orientation of one or more of the clamps 124A, 124B, and 124C may be changed without altering the orientation of the holder 122.

While the embodiments of the golf club holster described above with respect to FIGS. 1-4 have included a shaft that may include or may be formed from adjustable components, other embodiments of a golf club holster are also possible. In some embodiments, one or more clamps or clips may be coupled to a substrate, which may be releasably coupled to a structure, such as the top edge or side of a golf bag. One possible example of such alternative golf club holster is described below with respect to FIGS. 5 and 6.

Figure 5:
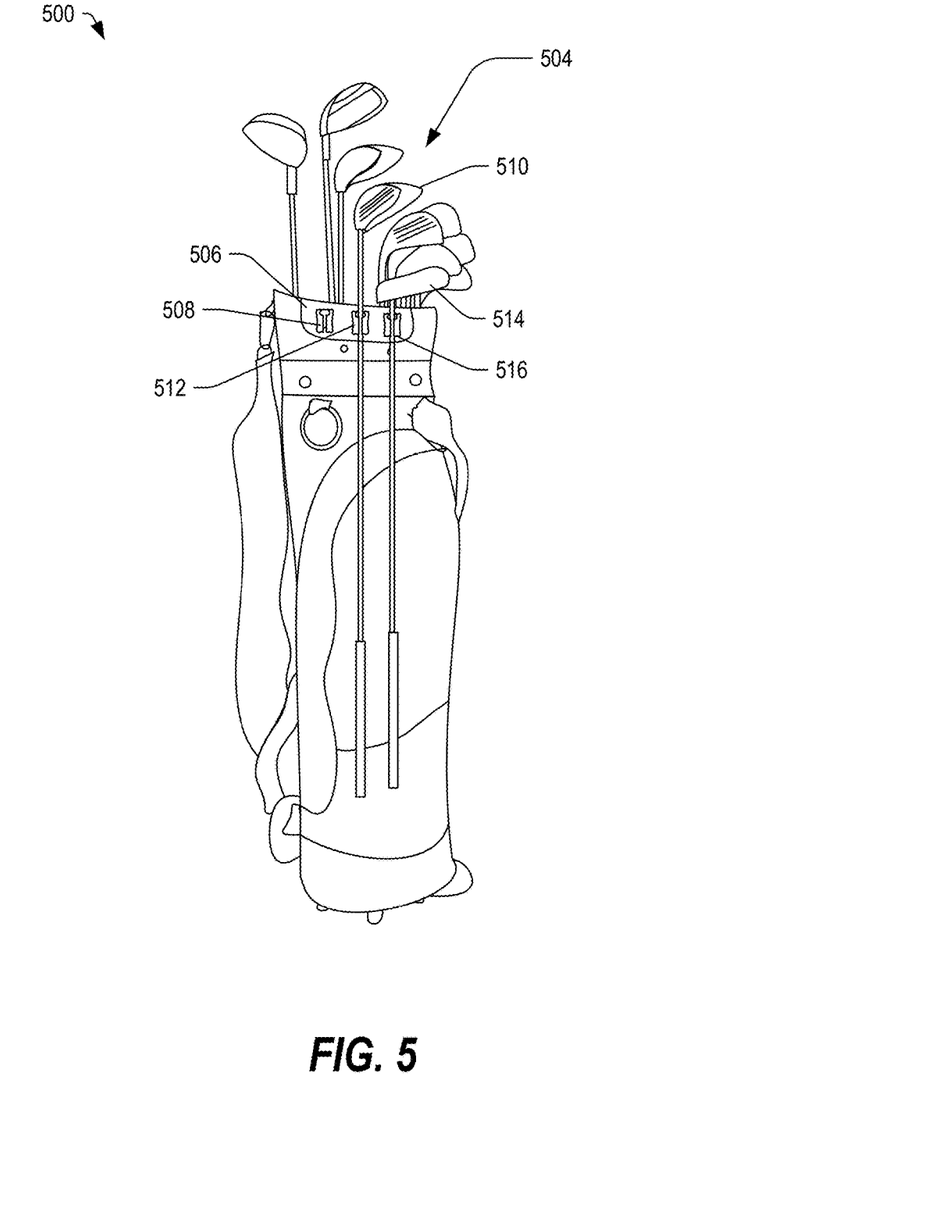
FIG. 5 is a side view of an apparatus including a golf club bag and including a second embodiment of a golf club holster, in accordance with certain embodiments of the present disclosure.

FIG. 5 is a side view of an apparatus 500 including a golf club bag 502 and including a second embodiment of a golf club holster 506, in accordance with certain embodiments of the present disclosure. The golf club bag 502 may be configured to hold a plurality of golf clubs 504. Further, the golf club bag 502 may include pockets configured to hold golf balls, tees, and other items frequently used by golfers.

The golf club holster 506 may include a plurality of clamps or clips 508, 512, and 516, which may be configured to secure a shaft of a golf club. For example, the clamp 512 may secure a shaft of a driver 510, and the clamp 516 may secure a shaft of a putter 514. The clamps 508, 512, and 516 may be used to secure other golf clubs, and the putter 514 and the driver 510 may be secured interchangeably via the clamps 508, 512, and 516.

In the illustrated embodiment, the golf club holster 506 may fit over a top edge of the golf bag 502 and extend at least partially into the golf bag 502 to secure the golf club holster 506 via pressure. In the illustrated embodiment, the clamps 508, 512, and 516 may be fastened, glued, or otherwise secured to a substrate of the golf club holster 506 or may be formed as a unitary piece of molded or carved material with the substrate of the golf club holster 506. Other embodiments are also possible.

Figure 6:
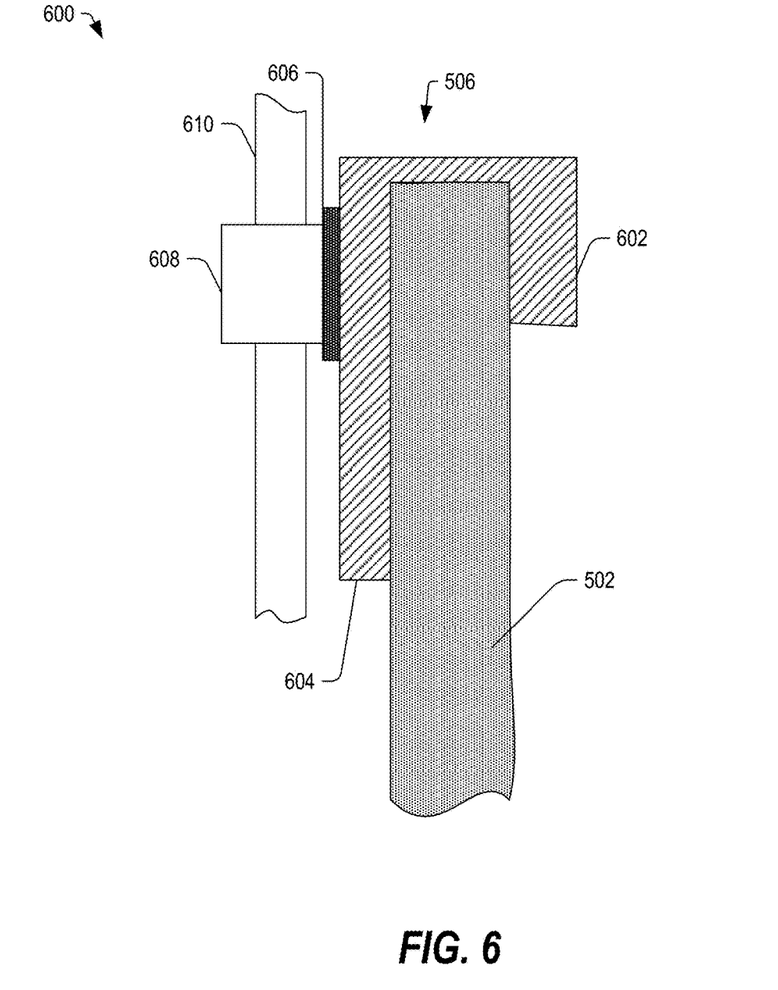
FIG. 6 is a cross-sectional view of the golf club holster of FIG. 5, in accordance with certain embodiments of the present disclosure.

FIG. 6 is a cross-sectional view 600 of the golf club holster 506 of FIG. 5, in accordance with certain embodiments of the present disclosure. The golf club holster 506 may include a substrate 604, which may be positioned in contact with an exterior surface of the golf bag 502, and may include a hook portion 602, which may be positioned over a top edge of the golf bag 502 and in contact with an interior surface of the golf bag 502. The hook portion 602 may secure the golf club holster 506 to the golf bag 502. The golf club holster 506 may include a clamp 608, which may be coupled to the substrate 604 at an attachment location 606. In some embodiments, the clamp 608 may be screwed or bolted to the substrate 604 at the attachment location 606. In some embodiments, the clamp 608 may be glued or welded (metallic weld, soldered, or sonic welded) to the substrate 604 at the attachment location 606. In the illustrated example, a portion of a shaft 610 of a golf club is shown extending into and out of the clamp 608.

In the illustrated example of FIGS. 5 and 6, the golf club holster 506 may be formed from a semi-rigid material, such as a plastic, fiberglass, or other material that does not break easily and that can support the weight of at least three golf clubs. In some embodiments, the golf club holster 506 may include a flexible portion configured to fit the contour of the exterior surface of the golf bag 502 and a rigid portion configured to apply force to the golf bag 502 to secure the golf club holster 506 in a selected position. In some embodiments, the golf club holster 506 may further include a shaft and a second substrate coupled to the shaft at a position that is lower relative to the top of the golf bag in order to provide further support for the golf clubs. Other embodiments are also possible.

Figure 7:
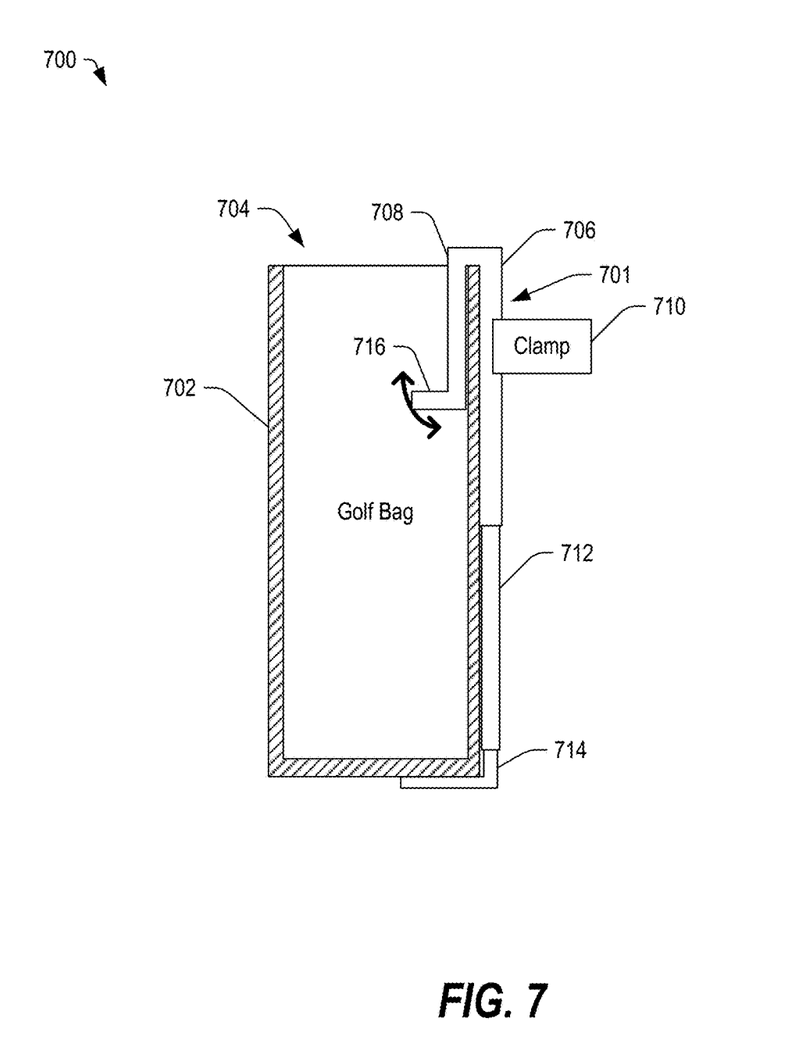
FIG. 7 is a cross-sectional view of a system including an alternative embodiment of a golf club holster, in accordance with certain embodiments of the present disclosure.

FIG. 7 is a cross-sectional view of an alternative embodiment of system 700 including a golf club holster 701, in accordance with certain embodiments of the present disclosure. The system 700 may include a golf bag 702 defining an opening 704 sized to receive a plurality of golf clubs. The system 700 may further include the golf club holster 701 coupled to the golf bag 702.

In the illustrated example, the golf club holster 701 may include a substrate 706 and a fastener 708 coupled to the substrate 706 and configured to couple the substrate 706 to an external surface of the golf bag 702. The golf club holster 701 may further include at least one clamp 710 coupled to the substrate 706 and configured to grip a shaft of a golf club. The substrate 706 may be implemented as a shaft having multiple segments, such as the shaft 102 in FIGS. 1 and 2. In the illustrated example, the substrate 706 includes at least one telescoping segment 712, which may be adjusted longitudinally in a direction of a vertical axis of the shaft or substrate and in the same direction as the length of the golf bag. The substrate 706 may further include a clamp portion 714, which may extend from the end of the at least one telescoping segment 712 beneath a bottom surface of the golf bag 702. In this example, the clamp portion 714 may utilize the weight of the golf bag 702 to partially stabilize the substrate 706. In some embodiments, the fastener 708 may extend into the opening 704 of the golf bag 702.

In the illustrated embodiment, the fastener 708 may include one more extendable arms 710, which may be adjusted to fit against an interior surface of the golf bag 702 to provide further stabilization. In some embodiments, the fastener 708 may also include one or more telescoping segments to extend the fastener 708 to approximately a bottom of the golf bag 702. In some embodiments, the fastener 708 may include one or more user-selectable elements, such as nobs, which may be tightened to increase the pressure between the fastener 708 and the golf bag 702 to enhance stability. Other embodiments are also possible. In some embodiments, the fastener 708, the one or more arms 710, and the clamp portion 714 may be included in with the other features of the golf club holster 100 in FIGS. 1-3.

It should be appreciated that the various elements described above with respect to FIG. 7 may be combined with elements from other embodiments in FIGS. 1-6. Further, in some embodiments, the golf club holster 701 may include any or all of the elements of any one of the embodiments of the golf club holsters of FIGS. 1-6.

Figure 8A:
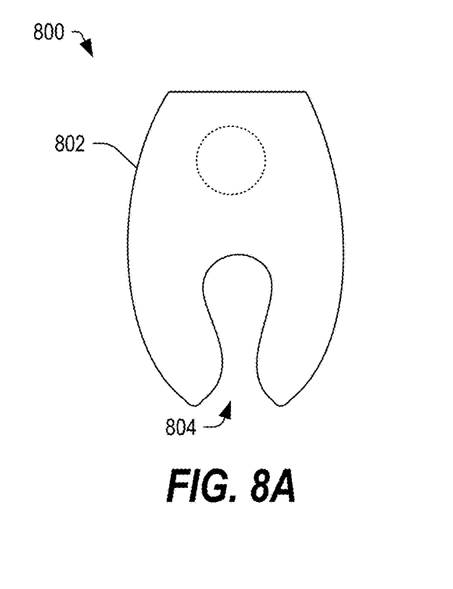
FIGS. 8A-8D are diagrams of example embodiments of clamps that may be used in connection with a golf club holster, in accordance with certain embodiments of the present disclosure.

FIGS. 8A-8D are diagrams of example embodiments of clamps that may be used in connection with a golf club holster, in accordance with certain embodiments of the present disclosure. In FIG. 8A, a diagram of a clamp 800 is shown that may include an opening (it could also include three or multiple openings) sized to receive a shaft of a golf club. The clamp 800 further includes a circle in phantom indicating a location of the shaft 102 in FIG. 1. In the illustrated example, the opening is tapered to allow for easy installation or retrieval of the club shaft and to prevent the shaft from falling out.

Figure 8B:
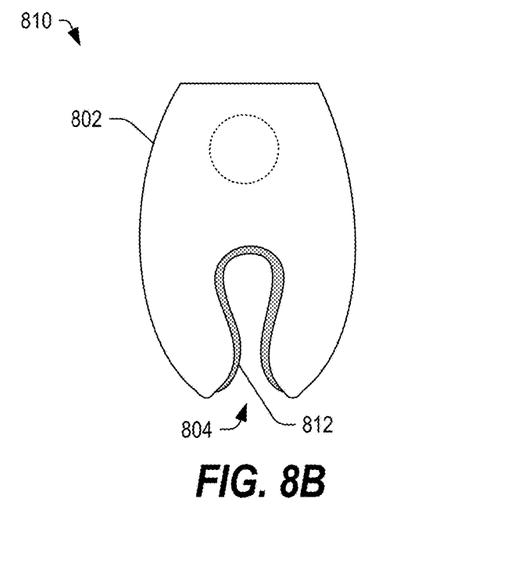

In FIG. 8B, the interior surface of the opening 804 of the clamp 802 is coated to provide a soft bumper and to enhance friction between the shaft and the clamp 810. In the illustrated example, the coating is indicated at 812. The coating 812 may be formed of a soft rubber, a thermoplastic material, a fabric (such as nylon or felt), another material, or any combination thereof.

Figure 8C:
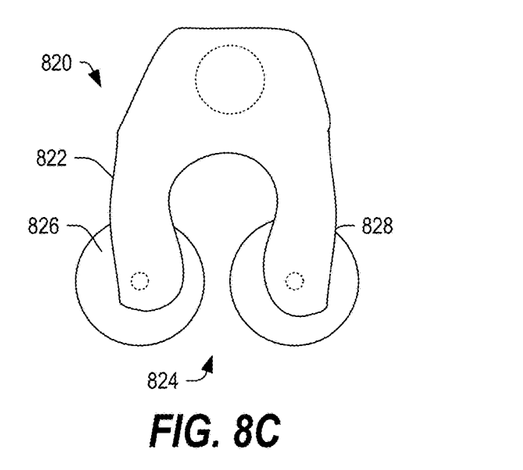

In FIG. 8C, a clamp 820 is shown, which may include a body portion 822 having arms extending about an opening 824. The clamp 820 may further include rollers 826, which may be coupled to the arms of the body portion 822 by an axle 828, which may be formed from a pin and which may be configured to allow the rollers 826 to rotate to allow for insertion of the shaft. The rollers 826 may apply sufficient pressure to prevent the shaft from falling out of the clamp 820. In this example, the interior of the clamp may be coated with a soft rubber, a thermoplastic material, a fabric, another material, or any combination thereof to prevent scratching of the shaft.

Figure 8D:
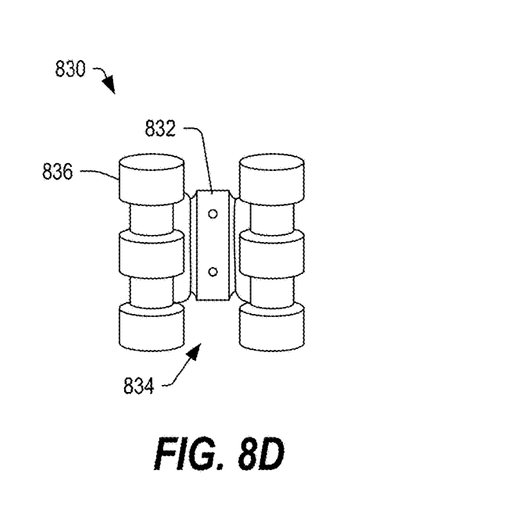

In FIG. 8D, a clamp 830 is shown that has a different embodiment of a roller configuration. The clamp 830 may include a body portion 832, which may be fastened to a substrate. Further, the clamp 830 may include rollers 836, which may rotate about an axis to allow for insertion of and removal of the shaft of a golf club.

In the embodiments of FIGS. 8C and 8D, the rollers or wheels may be formed from a soft rubber material to prevent scratching of the club shaft. Further, the clamps may be formed from wood, plastic, or metal, and the interior surface of the clamp may be coated or otherwise treated to prevent scratching of the club shaft.

Figure 9:
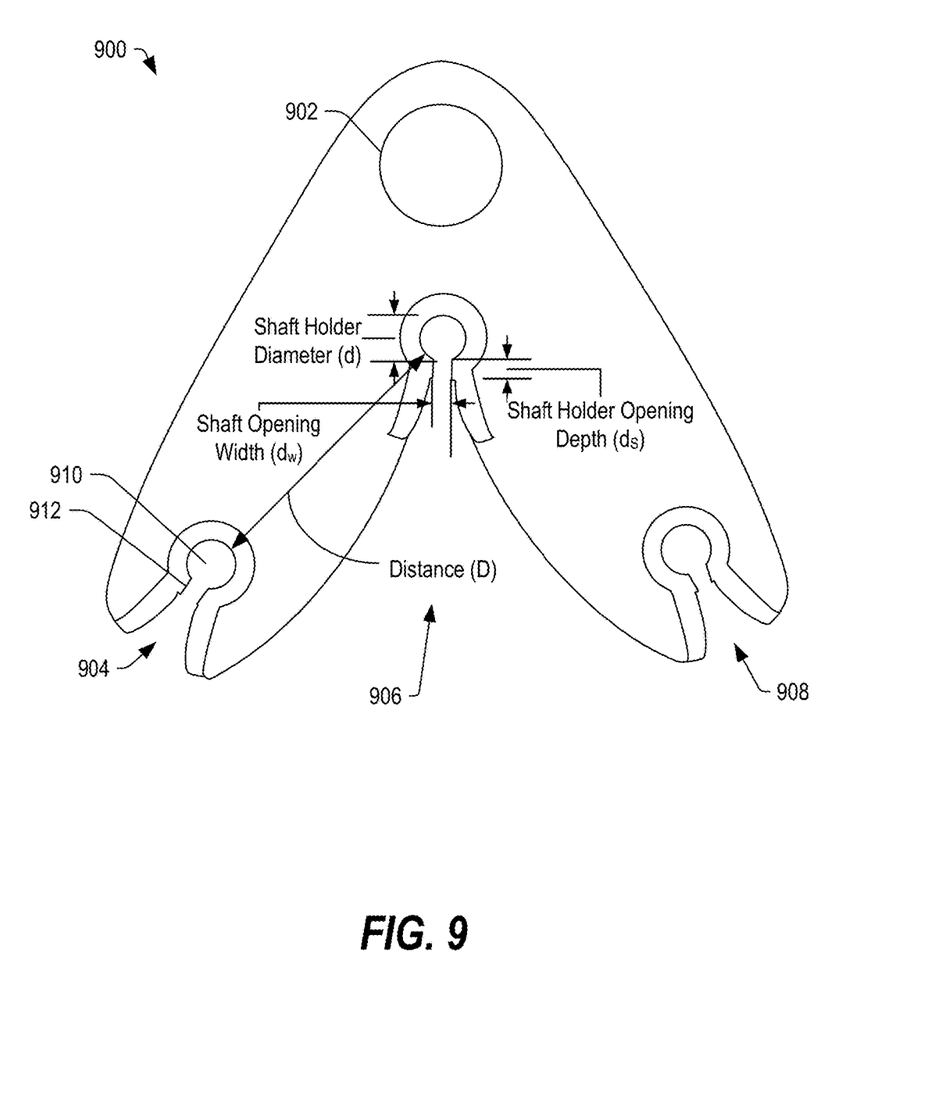
FIG. 9 depicts a club holder element including multiple clamps configured to secure multiple clubs that can be used on connection with the golf club holster, in accordance with certain embodiments of the present disclosure.

FIG. 9 depicts a club holder element 900 including multiple clamps 904, 906, and 908 configured to secure multiple clubs that can be used on connection with the golf club holster, in accordance with certain embodiments of the present disclosure. In an example, the club holder element 900 may include an opening 902 sized to fit onto the shaft 102 of the golf club holster 100. The club holder element 900 may further include a center clamp 906, a left clamp 904, and a right clamp 908. Each clamp 904, 906, and 908 may be approximately the same size with respect to the opening 910 and with respect to a shaft squeeze portion 912 through which the shaft of the golf club may be inserted.

In an example, the shaft holder diameter (d) of the opening 910 may be approximately 0.4 inches or larger. The shaft squeeze portion 912 may have a depth ($d_s$) of approximately 0.25 inches. Further, the squeeze portion 912 may further include a shaft opening width ($d_w$) that is approximately equal to the diameter of the shaft and may include a compressible material to allow the shaft to pass through into the opening 910. In certain embodiments, both the squeeze portion 912 and the opening 910 may be lined with a material selected to protect the shaft from scratching. In certain embodiments, the openings 910 may be separated from one another by a selected spacing or distance (D), such as a Euclidean distance of approximately three inches from a closest edge of an opening 910 of a center clamp 906 to either the left clamp 904 or the right clamp 908. In another embodiment, the openings may be spaced by a different spacing, such as 4 inches center to center, or by another spacing sufficient to prevent the club heads from contacting one another. In certain embodiments, the spacing between openings 910 and the different club lengths may cooperate to prevent the heads of the adjacent clubs from contacting one another.

Figure 10:
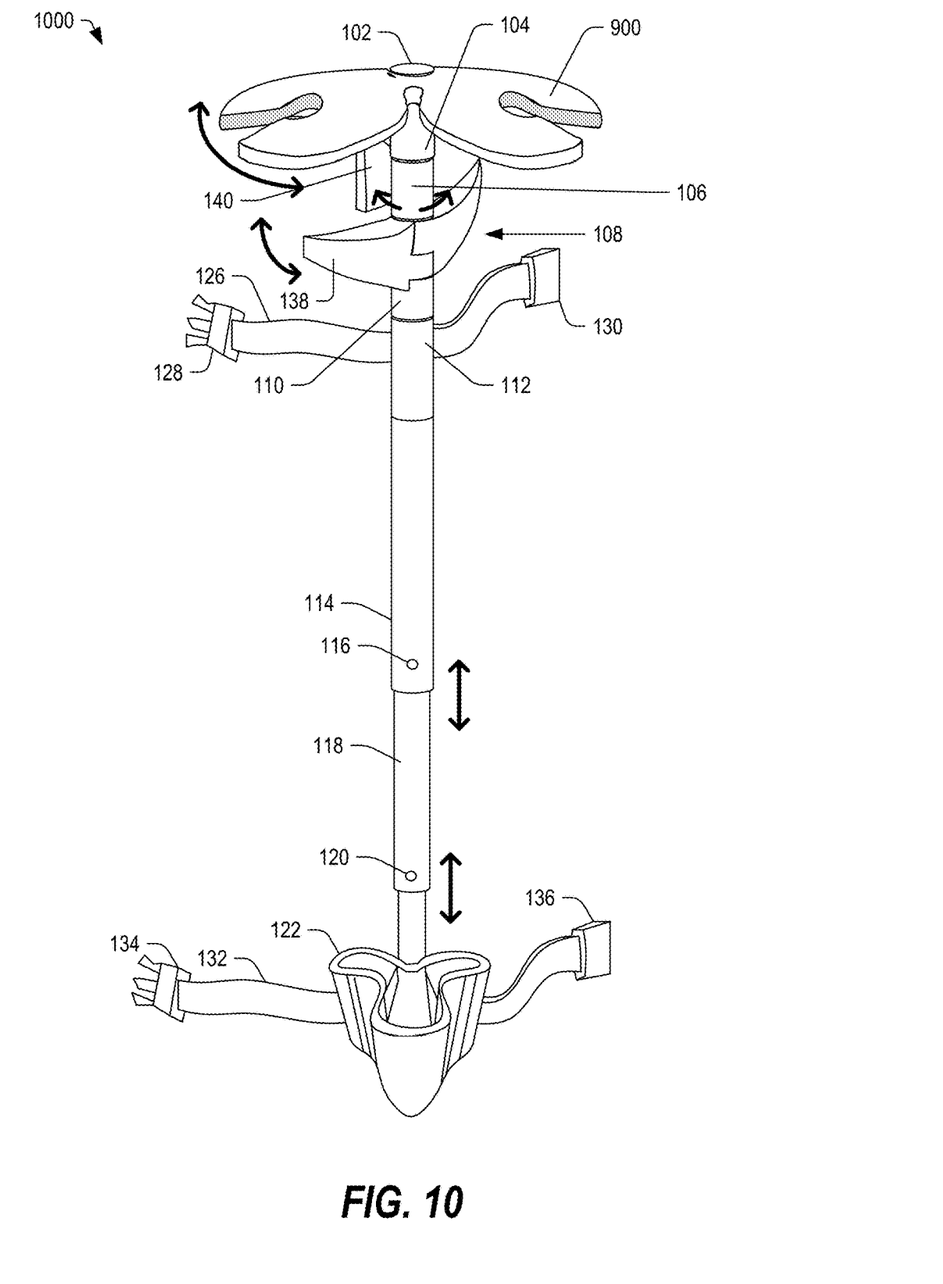
FIG. 10 illustrates a golf club holster including the club holder element of FIG. 9, in accordance with certain embodiments of the present disclosure.

FIG. 10 illustrates a golf club holster 1000 including the club holder element 900 of FIG. 9, in accordance with certain embodiments of the present disclosure. In certain embodiments, the golf club holster 1000 may include all of the elements of the golf club holster 100 of FIG. 1, except that the clamp 124 has been replaced with the club holder element 900. In the illustrated example, all of the clamps 124 have been replaced with the club holder element 900. In other embodiments, in addition to the club holder element 900, the golf club holster 1000 may include one or more clamps 124 to further secure the golf clubs. Other embodiments are also possible.

In conjunction with the apparatus, devices, and methods described above with respect to FIGS. 1-10, a golf club holster is described that may include one or more clamps configured to secure a shaft (or shafts) of a golf club (or multiple golf clubs) to an exterior surface of a golf bag to allow for quick retrieval and replacement of the golf club. In some embodiments, the golf club holster may include a hook portion configured to fit over a top edge of the golf bag and extending at least partially into the golf bag to secure the golf club holster to the bag. In some embodiments, the golf club holster may include a shaft extending longitudinally along a vertical axis corresponding to a length of the golf bag. In some embodiments, the shaft may include a plurality of adjustable segments. In some embodiments, the shaft may include one or more segments having straps configured to secure the shaft to the golf bag. In some embodiments, at least some of the segments can be rotated about the vertical axis and at least some of the segments may be extended (telescoped) along the vertical axis. In some embodiments, segments may be added to further extend a length of the golf club holster. Further, in some embodiments, the clamps may be adjusted in different directions to provide spatial separation between the golf clubs.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

Although the present invention has been described with reference to preferred embodiments, workers skilled in the art will recognize that changes may be made in form and detail without departing from the scope of the invention.

What is claimed is:

1. A golf club holster comprising:
    a substrate including a shaft defining an axis and formed of a plurality of segments including at least one rotatable segment configured to rotate about the axis;
    a fastener coupled to the substrate and configured to couple the substrate to a surface of a golf bag; and
    a plurality of clamps coupled to the substrate, each clamp configured to grip a golf club shaft of a golf club, each of the plurality of clamps configured to rotate about the shaft independent of others of the plurality of clamps.

2. The golf club holster of claim 1, wherein the plurality of segments further comprises at least one telescoping segment configured to extend axially in a longitudinal direction corresponding to the axis, the at least one telescoping segment configured to extend in the longitudinal direction along a length of the shaft.

3. The golf club holster of claim 2, wherein the at least one rotatable segment is coupled to at least one of the plurality of clamps.

4. The golf club holster of claim 2, wherein the fastener comprises:
    a hook configured to fit over a top edge of the golf bag and to extend at least partially into an opening at a top of the golf bag; and
    wherein the hook is coupled to the at least one rotatable segment.

5. The golf club holster of claim 2, wherein the fastener comprises:
    a hook configured to fit over a top edge of the golf bag and to extend at least partially into an opening at a top of the golf bag; and
    at least one strap coupled to the at least one rotatable element and configured to wrap around at portion of the golf bag.

6. The golf club holster of claim 1, wherein each of the plurality of clamps comprises:
    a body portion extending perpendicular to the substrate and including a proximal end coupled to the substrate and including a distal end; and
    an opening formed in the distal end and sized to receive the golf club shaft.

7. The golf club holster of claim 6, wherein:
    the opening in the body portion is tapered; and
    an interior surface of the opening is coated with at least one of a plastic, a rubber, and a fabric to prevent scratching of the golf club shaft of the one or more golf clubs.

8. The golf club holster of claim 1, further comprising a holder coupled to the substrate and configured to support a grip end of the golf club.

9. A golf club holster comprising:
    a shaft formed of a plurality of segments including at least one telescoping segment and at least one rotatable segment;
    a hook coupled to the shaft and configured to couple a top portion of the shaft to a top portion of a golf bag; and
    a plurality of clamps coupled to the shaft, each clamp configured to grip a golf club shaft of a golf club, each of the plurality of clamps configured to rotate about the shaft independent of others of the plurality of clamps.

10. The golf club holster of claim 9, wherein the at least one rotatable segment is coupled to at least one of the plurality of clamps.

11. The golf club holster of claim 9, further comprising a holder coupled to a distal end of the shaft, wherein the hook is coupled to the proximal end of the shaft.

12. The golf club holster of claim 9, further comprising at least one strap coupled to the shaft and configured to couple the shaft to the golf bag.

13. The golf club holster of claim 9, wherein the shaft comprises a button coupled to a proximal end of the shaft and accessible to extend the at least one telescoping segment.

14. The golf club holster of claim 9, wherein each of the plurality of clamps comprises:
    a body portion extending perpendicular to the substrate and including a proximal end coupled to the substrate and including a distal end; and
    an opening formed in the distal end and sized to receive the golf club shaft.

15. The golf club holster of claim 14, wherein:

the opening in the body portion is tapered; and an interior surface of the opening is coated with at least one of a plastic, a rubber, and a fabric to prevent scratching of the golf club shaft of the one or more golf clubs.

16. A golf club holster comprising:

a shaft formed of a plurality of segments including at least one telescoping segment and at least one rotatable segment;

a hook coupled to the shaft and configured to couple a top portion of the shaft to a top portion of a golf bag; and a plurality of clamps coupled to the shaft, the plurality of clamps including a first clamp and at least one second clamp, at least some of the plurality of clamps configured to rotate about the shaft independent of others of the plurality of clamps; and wherein each clamp is configured to grip a golf club shaft of a golf club.

17. The golf club holster of claim 16, wherein each of the plurality of clamps comprises:

a body portion extending perpendicular to the substrate and including a proximal end coupled to the substrate and including a distal end; and an opening formed in the distal end and sized to receive the golf club shaft.

18. The golf club holster of claim 16, wherein:

the hook is configured to fit over a top edge of the golf bag and to extend at least partially into an opening at a top of the golf bag; and the hook is coupled to the at least one rotatable segment.

19. The golf club holster of claim 16, wherein the at least one rotatable segment is coupled to at least one of the plurality of clamps.

20. The golf club holster of claim 19, further comprising a holder coupled to a distal end of the shaft, wherein the hook is coupled to the proximal end of the shaft.

* * * * *